[12] United States Patent
Yamada et al.

(10) Patent No.: US 11,157,724 B2
(45) Date of Patent: Oct. 26, 2021

(54) IMAGE DATA GENERATION DEVICE, IMAGE RECOGNITION DEVICE, IMAGE DATA GENERATION PROGRAM, AND IMAGE RECOGNITION PROGRAM

(71) Applicants: EQUOS RESEARCH CO., LTD., Tokyo (JP); KYUSHU INSTITUTE OF TECHNOLOGY, Kitakyushu (JP)

(72) Inventors: Hideo Yamada, Tokyo (JP); Ryuya Muramatsu, Tokyo (JP); Masatoshi Shibata, Tokyo (JP); Shuichi Enokida, Iizuka (JP)

(73) Assignees: EQUOS RESEARCH CO., LTD., Tokyo (JP); KYUSHU INSTITUTE OF TECHNOLOGY, Kitakyushu (JP)

( * ) Notice: Subject to any disclaimer, the term of this patent is extended or adjusted under 35 U.S.C. 154(b) by 0 days.

(21) Appl. No.: 16/634,589

(22) PCT Filed: Jul. 31, 2018

(86) PCT No.: PCT/JP2018/028606
§ 371 (c)(1),
(2) Date: Jan. 28, 2020

(87) PCT Pub. No.: WO2019/026890
PCT Pub. Date: Feb. 7, 2019

(65) Prior Publication Data
US 2020/0160043 A1 May 21, 2020

(30) Foreign Application Priority Data

Jul. 31, 2017 (JP) .............................. JP2017-148011
Feb. 28, 2018 (JP) .............................. JP2018-035744

(51) Int. Cl.
*G06K 9/00* (2006.01)
*G06K 9/62* (2006.01)
*G06K 9/78* (2006.01)

(52) U.S. Cl.
CPC ..... *G06K 9/00335* (2013.01); *G06K 9/00369* (2013.01); *G06K 9/00791* (2013.01); *G06K 9/6256* (2013.01); *G06K 9/78* (2013.01)

(58) Field of Classification Search
None
See application file for complete search history.

(56) References Cited

U.S. PATENT DOCUMENTS

2008/0205756 A1\* 8/2008 Kamata ................ G06K 9/6202
382/173
2009/0279738 A1 11/2009 Sasaki
(Continued)

FOREIGN PATENT DOCUMENTS

| JP | 2002-123834 A | 4/2002 |
| JP | 2017-187954 A | 10/2017 |
| WO | 2014/084218 A1 | 6/2014 |

OTHER PUBLICATIONS

Oct. 30, 2018 Search Report issued in International Application No. PCT/JP2018/028606.
(Continued)

*Primary Examiner* — Leon Flores
(74) *Attorney, Agent, or Firm* — Oliff PLC

(57) ABSTRACT

An image recognition device executes a Hilbert scan of frame image data constituting moving-image data to generate one-dimensional spatial image data, and further arrays the one-dimensional spatial image data in a time direction to generate two-dimensional spatio-temporal image data that holds spatial information and temporal information. The image recognition device converts the moving-image data into the two-dimensional spatio-temporal image data while holding the spatial and temporal information. By means of a CNN unit, the image recognition device executes a convolution process wherein a two-dimensional filter is used on the spatio-temporal image data to image-recognize a behavior of a pedestrian who is a recognition object. The image recognition device executes behavioral recognition of the pedestrian that requires a three-dimensional analysis consisting of two dimensions for space and one dimension for
(Continued)

time by the image recognition process of the two-dimensional image by the CNN, and estimates a state of the pedestrian.

10 Claims, 10 Drawing Sheets

(56) References Cited

U.S. PATENT DOCUMENTS

2011/0200258 A1* 8/2011 Suzuki ............... G06K 9/00798
382/199
2020/0242425 A1* 7/2020 Yamada ............. G06K 9/00362

OTHER PUBLICATIONS

Keisuke Hashimura et al., "Sign Language Recognition by Convolutional Neural Network With Concatenated Frame Image of Depth Image", The Institute of Electronics, Information and Communication Engineers, vol. 116, No. 248, Oct. 2016.
Shuiwang JI et al., "3D Convolutional Neural Networks for Human Action Recognition", Ieee Transactions on Pattern Analysis and Machine Intelligence, vol. 35, No. 1, Jan. 2013.
Mar. 19, 2021 Supplementary Search Report issued in European Patent Application No. 18841314.0.
Takeshi Saitoh et al., "Scene Recognition by CNN Using Frame Connected Images", The 19th Meeting on Image Recognition and Understanding, Aug. 2016 (with English summary).

* cited by examiner

FIG.7

|  | PERCENTAGE OF CORRECT ANSWERS (%) |
|---|---|
| SPATIO-TEMPORAL IMAGE | 77.1 |
| LSTM (CONVENTIONAL TECHNOLOGY) | 74.0 |

# IMAGE DATA GENERATION DEVICE, IMAGE RECOGNITION DEVICE, IMAGE DATA GENERATION PROGRAM, AND IMAGE RECOGNITION PROGRAM

TECHNICAL FIELD

The present invention relates to an image data generation device, an image recognition device, an image data generation program, and an image recognition program, and is related to recognition of various images, such as pedestrians, using CNN, for example.

BACKGROUND ART

In recent years, the deep learning using artificial intelligence has been actively studied, and great results have been reported in a field of image recognition of two-dimensional images using CNN.

Since moving images are images in which frame images which are two-dimensional images are arranged in time-series, there is an increasing demand for applying deep learning technologies with respect to two-dimensional images to moving images.

Non-Patent Literature 1 "3D Convolutional Neural Networks for Human Action Recognition" and Non-Patent Literature 2 "Scene Recognition by CNN using Frame Connected Images" have technologies for recognizing moving images using such a two-dimensional image recognition technology.

The technology of Non-Patent Literature 1 is a technology for executing a convolution process by applying a convolution filter composed of two dimensions for space and one dimension for time to moving-image data.

The technology of Non-Patent Literature 2 is a technology for representing a temporal change of an object with one two-dimensional image by arranging and connecting a series of frame images obtained by capturing a movement (utterance scene) of the target in a tile shape. This is supplied to an image recognition device by CNN to recognize a scene.

However, since the technology of Non-Patent Literature 1 repeatedly uses a three-dimensional convolution filter for moving-image data, and there has been a problem that a calculation cost increases and a large-scale calculating machine is required.

Since the technology described in Non-Patent Literature 2 uses a two-dimensional convolution filter, a calculation cost could be reduced, but there is no relevance of information between pixels of images adjacent in a tile shape, and therefore there has been a problem that recognition accuracy of an object is reduced.

CITATION LIST

Non-Patent Literatures

Non-Patent Literature 1: IEEE Transactions on Pattern Analysis and Machine Intelligence, Vol. 35, pp. 221-231, 2013, "3D Convolutional Neural Networks for Human Action Recognition"

Non-Patent Literature 2: MIRU2016 the 19th Meeting on Image Recognition and Understanding, PS1-27, "Scene Recognition by CNN using Frame Connected Images"

DISCLOSURE OF INVENTION

Problem to be Solved by the Invention

The object of the present invention is to recognize from images a dynamic object to be recognized.

SUMMARY OF THE INVENTION(S)

(1) The invention described in claim 1 provides an image data generation device comprising: a time-series spatial information acquiring means for acquiring time-series spatial information in which a position of a recognition object in space is recorded in accordance with a lapse of time; a data value acquiring means for scanning the acquired time-series spatial information in a predetermined direction to acquire a column of data values in the aforementioned predetermined direction; an image data generation means for generating image data for image-recognizing the recognition object by arranging the acquired column of the data values corresponding to the other direction of the time-series spatial information; and an output means for outputting the generated image data.

(2) The invention described in claim 2 provides the image data generation device according to claim 1, wherein the predetermined direction is a spatial direction of the time-series spatial information, and the other direction is a time direction of the time-series spatial information.

(3) The invention described in claim 3 provides the image data generation device according to claim 1 or 2, wherein the data value acquiring means sets a curve which repeats bending corresponding to locality of the data values in the predetermined direction as a scanning path, and acquires the column of the data values along the aforementioned set scanning path.

(4) The invention described in claim 4 provides the image data generation device according to claim 3, wherein the data value acquiring means sets a space-filling curve as the curve which repeats the bending.

(5) The invention described in claim 5 provides the image data generation device according to claim 4, wherein the time-series spatial information is moving-image data acquired by capturing the recognition object, the image data generation means sets the curve to each frame image data of the moving-image data, scans each frame image data to acquire the column of pixel values as the column of data values, and the image data generation means generates two-dimensional image data in which the column of the pixel values for each frame image data is arranged corresponding to the time direction.

(6) The invention described in claim 6 provides the image data generation device according to claim 5, wherein the data value acquiring means changes setting conditions of the curve for each frame image data.

(7) The invention described in claim 7 provides the image data generation device according to claim 6, wherein the data value acquiring means changes setting ranges of the curve as the setting conditions.

(8) The invention described in claim 8 provides the image data generation device according to claim 6, wherein the data value acquiring means changes setting forms of the curve for each frame image data as the setting conditions.

(9) The invention described in claim 9 provides the image data generation device according to claim 6, 7, or 8, wherein the data value acquiring means changes the setting conditions of the curve for the same frame image data, and acquires data values for each the aforementioned setting condition.

(10) The invention described in claim 10 provides the image data generation device according to claim 2, wherein the data value acquiring means acquires the column of the data values along a linear scanning path.

(11) The invention described in claim 11 provides the image data generation device according to claim 10, wherein the time-series spatial information is moving-image data acquired by capturing the recognition object, and the image data generation device further comprises a scanning direction determining means for determining a scanning direction of the scanning path for at least a part of still image data of frame images constituting the moving-image data, wherein the data value acquiring means acquires the column of the data values along the determined scanning direction, and the image data generation means generates two-dimensional image data in which the column of the pixel values for each still image data is arranged corresponding to the time direction.

(12) The invention described in claim 12 provides the image data generation device according to claim 11, wherein the scanning direction determining means determines a non-longitudinal direction of an image formed with the still image data, as the scanning direction.

(13) The invention described in claim 13 provides an image recognition device comprising: the image data generation device according to any one of claims 1 to 12; an image data acquiring means for acquiring image data output from the image data generation device; a learning data acquiring means for acquiring learning data for image-recognizing a recognition object; and a recognition means for recognizing the recognition object included in the acquired image data using the acquired learning data.

(14) The invention described in claim 14 provides an image data generation program realizing functions by using a computer, the functions comprising: a time-series spatial information acquiring function for acquiring time-series spatial information in which a position of a recognition object in space is recorded in accordance with a lapse of time; a data value acquiring function for scanning the acquired time-series spatial information in a predetermined direction to acquire a column of data values in the aforementioned predetermined direction; an image data generation function for generating image data for image-recognizing the recognition object by arranging the acquired column of the data values corresponding to the other direction of the time-series spatial information; and an output function for outputting the generated image data.

(15) The invention described in claim 15 provides an image recognition program realizing functions by using a computer, the functions comprising: a time-series spatial information acquiring function for acquiring time-series spatial information in which a position of a recognition object in space is recorded in accordance with a lapse of time; a data value acquiring function for scanning the acquired time-series spatial information in a predetermined direction to acquire a column of data values in the aforementioned predetermined direction; an image data generation function for generating image data for image-recognizing the recognition object by arranging the acquired column of the data values corresponding to the other direction of the time-series spatial information; an output function for outputting the generated image data; an image data acquiring function for acquiring the output image data; a learning data acquiring function for acquiring learning data for image-recognizing a recognition object; and a recognition function for recognizing the recognition object included in the acquired image data using the acquired learning data.

Effect of the Invention(s)

According to the present invention, a dynamic recognition object can be image-recognized by generating spatio-temporal image data both having spatial information and temporal information.

BRIEF DESCRIPTION OF DRAWINGS

FIG. 7 is a diagram for describing an experimental result.

BEST MODE(S) FOR CARRYING OUT THE INVENTION (1) Outline of Embodiment

Figure 1A:
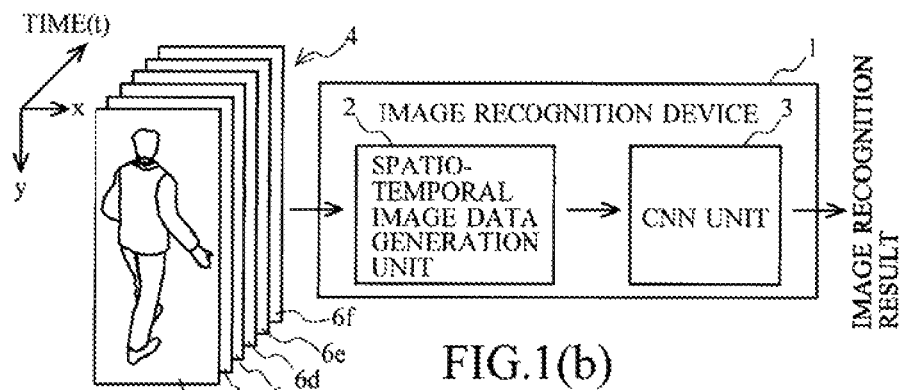
FIG. 1 are a diagram for describing a configuration of an image recognition device.

By means of a spatio-temporal image data generation unit 2, an image recognition device 1 (FIG. 1) executes a Hilbert scan of frame image data 6 constituting moving-image data 4 to generate one-dimensional spatial image data 7, and further arrays the one-dimensional spatial image data 7 in a time direction to generate two-dimensional spatio-temporal image data 8 that holds spatial information and temporal information.

Thus, the image recognition device 1 converts the moving-image data 4 into the two-dimensional spatio-temporal image data 8 while holding the spatial information and temporal information.

Next, by means of a CNN unit 3, the image recognition device 1 executes a convolution process in which a two-dimensional filter is used on the spatio-temporal image data 8 to image-recognize a behavior of a pedestrian who is a recognition object.

Thus, the image recognition device 1 can execute behavioral recognition of the pedestrian that requires a three-dimensional analysis consisting of two dimensions for space and one dimension for time by means of the image recognition process of the two-dimensional image by the CNN (one of artificial intelligence using deep learning), and thereby can estimate a state of the pedestrian.

(2) Details of Embodiment

Figure 1B:
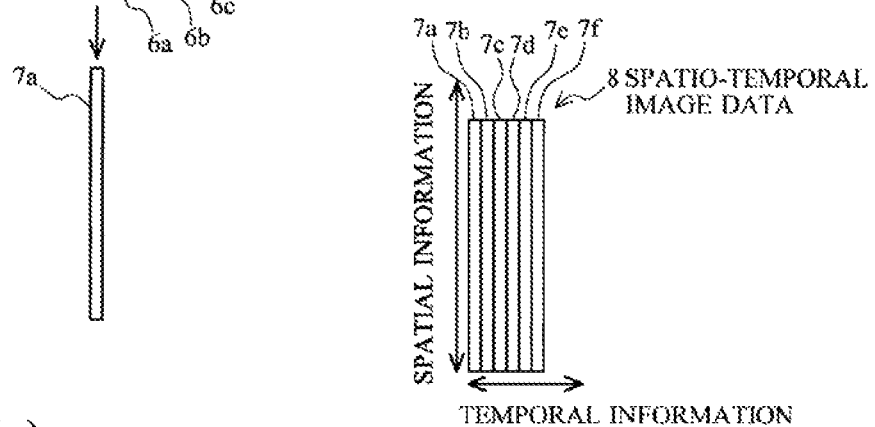

FIG. 1 are a diagram for describing a configuration of an image recognition device 1 according to the embodiment.

The image recognition device 1 illustrated in FIG. 1(*a*) is an in-vehicle device, and includes a spatio-temporal image data generation unit 2 configured to generate image data for image recognition, and a CNN unit 3 configured to execute an image recognition process by means of artificial intelligence using deep learning. The image recognition device 1 analyze moving-image data output from an in-vehicle camera and image-recognizes the presence or absence of a pedestrian outside the vehicle and classification of an operating state (right upright, right walking, left upright, left walking, and the like).

It is to be noted that this is merely an example, it can be widely used for general applications for recognizing dynamic recognition objects, such as reading roads and topographies in front of a vehicle, or recognizing and tracking a passerby etc. by being connected to a surveillance camera.

The spatio-temporal image data generation unit 2 is a module functioned as an image data generation device, and is configured to convert moving-image data 4 captured and generated by a camera into spatio-temporal image data 8.

The moving-image data 4 captured by the camera is composed of frame image data 6*a*, 6*b*, . . . which are generated in time-series.

Hereinafter, unless particularly distinguish the frame image data 6*a*, 6*b*, . . . from one another, it is simply described as frame image data 6, and the same applies to other components described later.

The frame image data 6 is two-dimensional still image data having a component (x, y) in the spatial direction obtained by capturing a subject (recognition object) in a certain moment.

The moving-image data 4 is a sets of still image data in which the frame image data 6 is arranged in the time direction (considered as t-axis) systematically in time-series in accordance with a capturing time, and corresponds to three-dimensional data obtained by totalizing two dimensions in the spatial direction and a one dimension in the time direction.

The moving-image data 4 used herein functions as time-series spatial information in which a position of the recognition object in space is recorded in accordance with a lapse of time.

The spatio-temporal image data generation unit 2 reads a predetermined number (Q frames) of the frame image data 6 sequentially transmitted from a camera in time-series.

Thus, the spatio-temporal image data generation unit 2 includes a time-series spatial information acquiring means for acquiring the time-series spatial information from the camera.

Here, as an example, six frames of the frame image data 6 from a first frame image data 6*a* to the latest frame image data 6*f* are read.

In addition, the frame image data 6 may be read every predetermined number or at random, or frame dropping may occur, as long as image recognition accuracy is kept within an allowable range.

In addition, the order of reading the frame image data 6 can be reversed.

More specifically, the spatio-temporal image data generation unit 2 may read the predetermined number of the frame image data 6 from the latest data to the past data in time-series, among the frame image data 6 sequentially transmitted from the camera. As an example of this case, six frames of the frame image data 6 from the latest frame image data 6*f* to the past frame image data 6*a* will be read.

When the spatio-temporal image data generation unit 2 reads the frame image data 6, the spatio-temporal image data generation unit 2, first, unicursally sets a Hilbert curve (below-mentioned) with respect to the frame image data 6*a* in the spatial direction (plane direction of a plane stretched by an x-axis and a y-axis). Then, the spatio-temporal image data generation unit 2 scans and reads pixel values of pixels of the frame image data 6*a* along the aforementioned Hilbert curve, and develops them in one line. This processing is called a Hilbert scan and details thereof will be described later.

One-dimensional spatial image data 7*a* which are one-dimensional data in the spatial direction including spatial information, at the time when capturing the frame image data 6*a*, is acquired by executing the Hilbert scan of the frame image data 6*a*.

Similarly, the spatio-temporal image data generation unit 2 also converts the frame image data 6*b* to 6*f* into one-dimensional spatial image data 7*b* to 7*f* (not illustrated).

As will be described later, since the Hilbert curve is bent, when it is scanned along this Hilbert curve, the two-dimensional image can be converted into one-dimensional image, while holding locality of the image as much as possible.

Thus, the spatio-temporal image data generation unit 2 includes a data value acquiring means for scanning time-series spatial information in a predetermined direction (it is a time direction in this example, but may also be the spatial direction) to acquire a column of data values (pixel values in this example) in the aforementioned predetermined direction.

Then, the aforementioned data value acquiring means sets the curve (Hilbert curve in this example) which repeats bending corresponding to the locality of the data values in the aforementioned predetermined direction as a scanning path, scans the time-series spatial information along the set aforementioned curve to acquire the column of the data values (pixel values in this example) in the aforementioned predetermined direction.

Subsequently, as illustrated in FIG. 1(*b*), the spatio-temporal image data generation unit 2 arranges the one-dimensional spatial image data 7*a* to 7*f* in time-series in the time direction (i.e., in order of the capturing times) to generate spatio-temporal image data 8 for image recognition.

Thus, the spatio-temporal image data generation unit 2 includes an image data generation means for generating the image data (spatio-temporal image data 8) for image-recognizing the recognition object by arranging the column of the acquired data values corresponding to the other direction (time direction in this example) of the time-series spatial information.

The spatio-temporal image data 8 is two-dimensional image data in which a direction of one side represents spatial information (spatial component) and the other side orthogonal thereto represents temporal information (temporal component).

Thus, the spatio-temporal image data generation unit 2 converts the moving-image data 4 which is three-dimensional time-series spatial data into spatio-temporal image data 8 which is two-dimensional image data by developing the moving-image data 4 by executing the Hilbert scan thereon in the spatial direction, while holding the spatial information and the temporal information.

It is to be noted that the arrangement of the one-dimensional spatial image data 7 is set as the time-series order, but the order may be changed as long as image recognition is possible.

As described above, the spatio-temporal image data generation unit 2 sets the curve to each frame image data of the moving-image data, scans each frame image data to acquire the column of pixel values as the column of data values, and further generates the two-dimensional image data in which the column of the pixel values for each frame image data is arranged corresponding to the time direction.

Returning to FIG. 1(a), the CNN unit 3 is a module for executing image recognition of the two-dimensional image data using Convolutional Neural Network (CNN).

An algorithm used by the CNN unit 3 has been highly evaluated as an image recognition method of two-dimensional image data, and has been widely utilized.

In the embodiment, the CNN unit 3 learns in advance various aspects which a pedestrian can take, such as right upright, right walking, left upright, left walking, and the like. The CNN unit 3 reads the spatio-temporal image data 8 output from the spatio-temporal image data generation unit 2, image-recognizes which classification class the pedestrian's aspect belongs on the basis thereof, and outputs a result thereof.

Thus, the spatio-temporal image data generation unit 2 includes an output means for outputting the generated image data to the CNN unit 3.

Figure 1C:
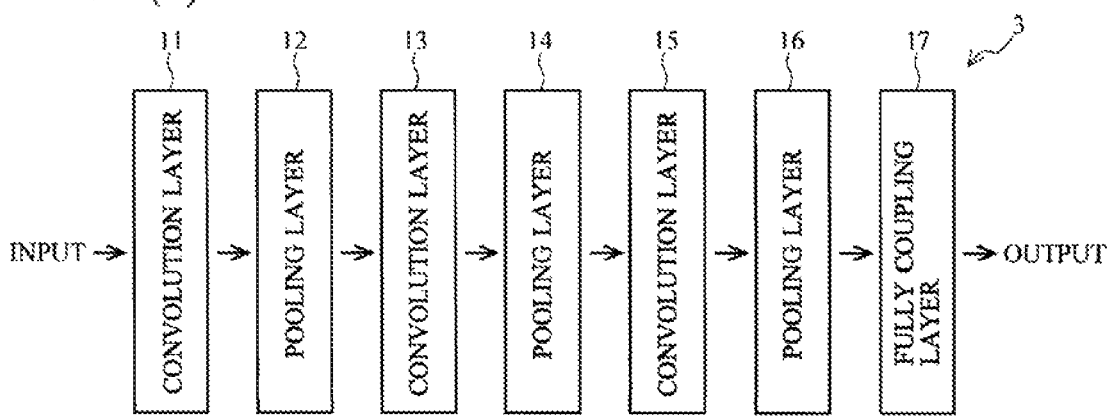

A configuration of the CNN unit 3 will now be described in more details with reference to FIG. 1(c).

The CNN unit 3 is composed by stacking a convolution layer 11, a pooling layer 12, a convolution layer 13, a pooling layer 14, a convolution layer 15, a pooling layer 16, and a fully coupling layer 17, from an input side.

The convolution layer 11 is a layer which extracts a characteristic grayscale structure of an image by filtering the input two-dimensional image data (spatio-temporal image data 8 in this case) by sliding a two-dimensional filter on the image; and executes a process corresponding to a frequency analysis.

The pooling layer 12 reduces the data by down-sampling the data while holding the features extracted by the convolution layer 11.

Since a pedestrian dynamically moves, a capturing position in the frame image data 6 deviates, but the deviation of the position of the spatial feature representing the pedestrian can be absorbed by means of the process of the pooling layer 12. Consequently, robustness of the image recognition accuracy with respect to the deviation of the spatial position can be improved.

The function of the convolution layers 13 and 15 are the same as that of the convolution layer 11. The function of the pooling layers 14 and 16 are the same as that of the pooling layer 12.

The fully coupling layer 17 is a general neural network, and is a layer for developing a two-dimensional feature map (data acquired through the convolution layer 11 to the pooling layer 16) in one dimension and executing a process such as regression analysis.

Thus, the CNN unit 3 extracts the feature of the image and absorbs the deviation of the position three times, and then executes a regression analysis process, to recognize the image of the pedestrian's aspect.

It is to be noted that values of the two-dimensional filter of convolution layers 11, 13, and 15 and a parameter of the fully coupling layer 17 are tuned through learning.

The learning is performed by preparing a large number of the spatio-temporal image data 8 for each classification class, inputting the prepared data into the image recognition device 1, and backpropagating a result thereof.

FIG. 2 are a diagram for describing the Hilbert scan executed by the spatio-temporal image data generation unit 2.

The Hilbert scan is a process of reading pixel values unicursally over the entire frame image data 6 by setting the Hilbert curve which passes through each pixel to the frame image data 6, and scanning it along the Hilbert curve.

Figure 2A:
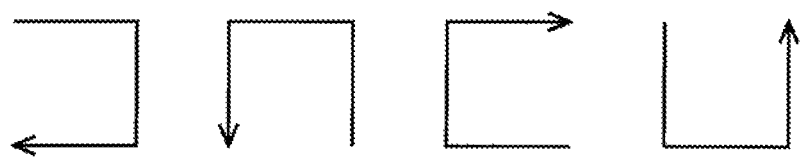
FIG. 2 are a diagram for describing a Hilbert scan.

The Hilbert curve is a curve which covers the entire space formed by combining U-shaped curves as illustrated in FIG. 2(a), and is a kind of curve called a space-filling curve. In addition to this curve, there are the Peano curve and the like in the space filling curve. The arrow line illustrated in the diagram illustrates a scanning direction.

Thus, the spatio-temporal image data generation unit 2 sets the space-filling curve as a curve which repeats bending.

Figure 2B:
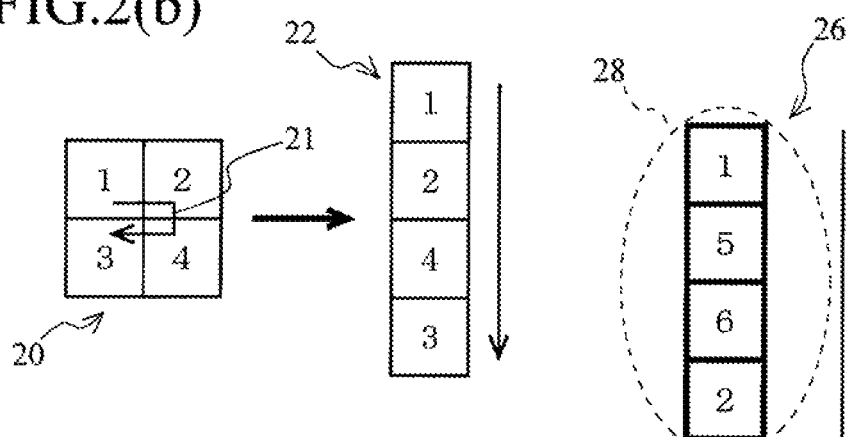

In an example of image data 20 in which m×m (m=2) pixels 1 to 4 are arranged as illustrated in FIG. 2(b), when the Hilbert curve 21 which passes through these pixels is set, and the pixel values read by scanning the pixel value in the direction of the arrow are arranged in one column, one-dimensional spatial image data 22 in which pixels 1 to 4 are arranged in order is acquired.

Figure 2C:
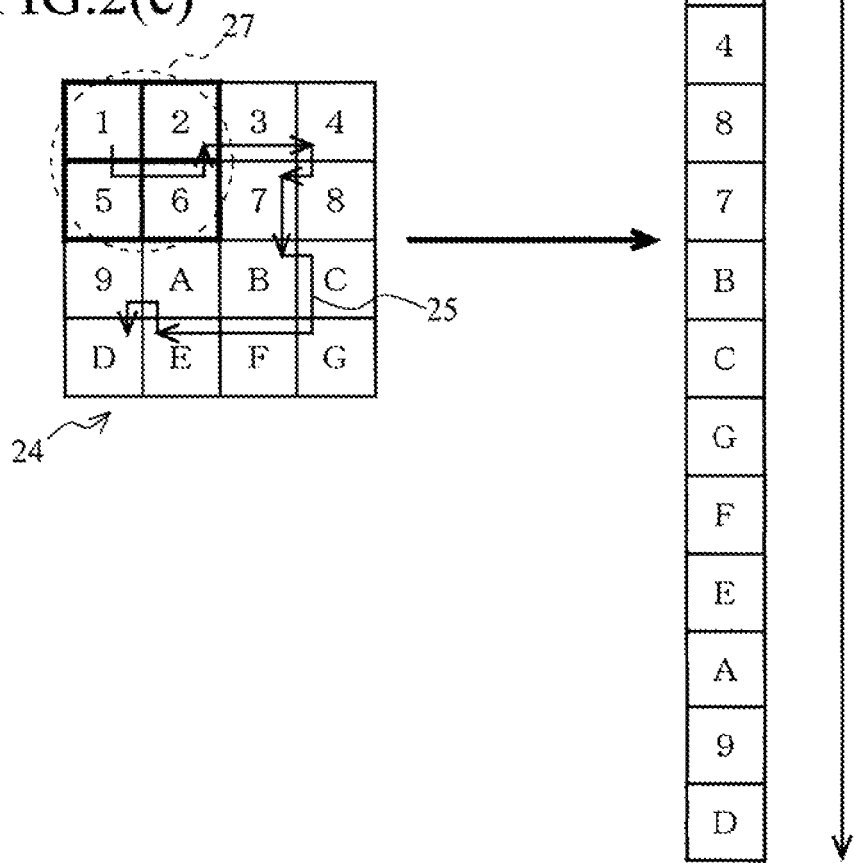

In an example of image data 24 in which m×m (m=4) pixels 1 to G are arranged as illustrated in FIG. 2(c), when the Hilbert curve 25 which passes through these pixels is set, and the pixel values read by scanning the pixel value in the direction of the arrow are arranged in one column, one-dimensional spatial image data 26 in which pixels 1 to G are arranged in order is acquired.

Further, image data with more pixels are similarly scanned in accordance with the Hilbert curve.

By the way, for example, in the image data 24 illustrated in FIG. 2(c), although the pixels 1, 2, 5, and are localized in a region 27, these pixels are also localized in a region 28 in the one-dimensional spatial image data 26.

Similarly, the pixels 3, 4, 7, and 8 localized in the image data 24 are also localized one-dimensional spatial image data 26 so as to be collected.

Thus, when the Hilbert scan is used, two-dimensional data can be converted into one-dimensional data, while holding locality of pixel values as much as possible.

In image recognition, since pattern recognition of features of the image is performed, it is important to generate the spatio-temporal image data 8 so that local features of an original image is not degraded as much as possible.

Therefore, the Hilbert curve is a curve suitable as a scanning line for scanning the frame image data 6.

It is noted that the curve used for scanning the frame image data 6 is not limited to the Hilbert curve, and another space-filling curve, such as a Peano curve, or a non-space-filling curve may be used.

In the embodiment, the Hilbert curve is bent in a pixel unit, but is also possible to make the reading interval coarse, for example, by bending every other pixel and reading every other pixel value. The smaller the interval, the higher the accuracy, but the calculation cost increases. Therefore, the reading interval may be determined in accordance with a degree of the locality required for the image recognition.

Thus, the spatio-temporal image data generation unit 2 can scan the three-dimensional data based on a moving image and convert it into the two-dimensional data. For this reason, the CNN unit 3 can filter the three-dimensional moving-image data with the two-dimensional filter. Consequently, the calculation cost can be remarkably reduced as compared with the conventional example of applying the three-dimensional filter to the moving-image data.

FIG. 3 are a diagram for describing a method of clipping the moving-image data 4.

As described above, the spatio-temporal image data 8 can be generated while holding the locality of the pixels in the frame image data 6 as much as possible by executing the Hilbert scan.

However, not all the locality is not stored, but there are some cases where localized pixels are separated from each other.

For example, in the example of the image data 24 described with reference to FIG. 2(c), the pixels 1, 2, 5, and 6 localized in the region 27 are also localized in the region 28 in the one-dimensional spatial image data 26.

However, when attention is paid to a region composed of the pixels 5, 6, 9, and A localized in the image data 24, the pixels 5 and 6 and the pixels 9 and A are separated from each other in the one-dimensional spatial image data 26, and thereby the locality is reduced.

For this reason, when the Hilbert scan is executed under the same condition to each frame image data 6, since the reduction in the locality that occurs between the pixels 5 and 6 and the pixels 9 and A occurs also in all the frame image data 6, the reduction of the locality is accumulated in time-series.

As a method of suppressing the reduction of the image recognition accuracy due to the reduction of the locality of the pixels, it is effective to change the setting conditions of the Hilbert curve for each frame image data 6 so that the pixels of which locality is lowered are differently distributed for each frame image data 6.

Therefore, the spatio-temporal image data generation unit 2 includes a function for clipping the frame image data 6 at random in order to change the setting conditions of the Hilbert curve for each frame image data 6 as described in the following.

Figure 3A:
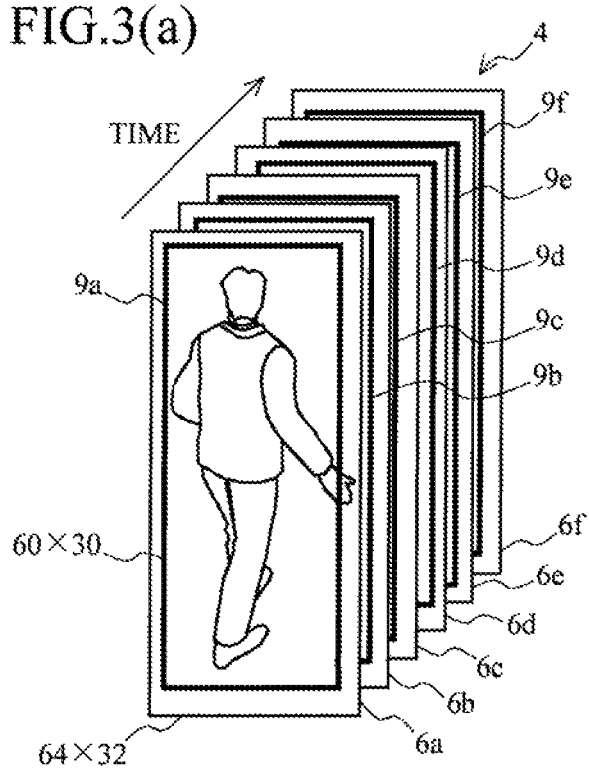
FIG. 3 are a diagram for describing a method of clipping moving-image data.

As illustrated in FIG. 3(a), frame image data 6a is assumed to be composed of 64×32 pixels as an example.

Meanwhile, the spatio-temporal image data generation unit 2 sets a region smaller than this size as the frame image data 6a at random (optionally), and extracts a clipping image 9a formed in the aforementioned region from the frame image data 6a. A size of the clipping image 9a is 60×30 as an example.

When setting the Hilbert curve to an image, it is required for a size of one side is 2 to the nth power (n is a natural number).

Figure 3B:
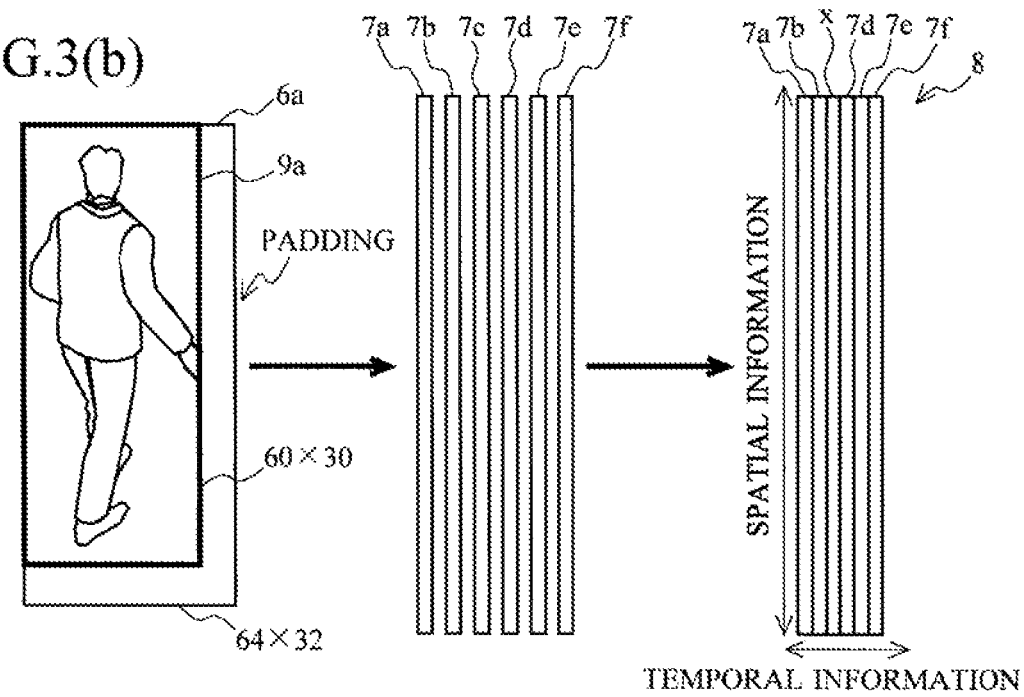

Therefore, as illustrated in FIG. 3(b), the spatio-temporal image data generation unit 2 executes a process called padding for adding appropriate pixels for the surrounding of the clipping image 9a to restore the 64×32 frame image data 6a.

Then, the spatio-temporal image data generation unit 2 scans the restored frame image data 6a by setting the Hilbert curve to generate the one-dimensional spatial image data 7a, skipping the pixel values of the added pixels without being read into a memory.

Similarly, the spatio-temporal image data generation unit 2 generates clipping images 9b to 9f by clipping frame image data 6b to 6f within optional ranges, and after padding the generated data, the Hilbert scan is executed to generate one-dimensional spatial image data 7b to 7f.

Then, the spatio-temporal image data generation unit 2 arranges the one-dimensional spatial image data 7a to 7f in order of time-series to generate spatio-temporal image data 8.

In the above-mentioned example, although the clipping image 9a is set as an optional region for each frame image data 6, it may be set in accordance with a certain regularity.

By setting the Hilbert curve to the frame image data 6 restored after the clipping, a starting point of the Hilbert curve and a path which passes through the pixels can be changed for each frame image data 6, and thereby delocalization of pixels can be distributed to various pixels.

Thus, the spatio-temporal image data generation unit 2 changes the curve setting conditions by changing the curve setting ranges for each frame image data.

Such a process of clipping a slightly smaller image from the learning image or the frame image data 6 to comprehensively hold the spatial information is called data augmentation.

The data augmentation is applied to both the moving-image data for pre-learning and the moving-image data 4.

Figure 4:
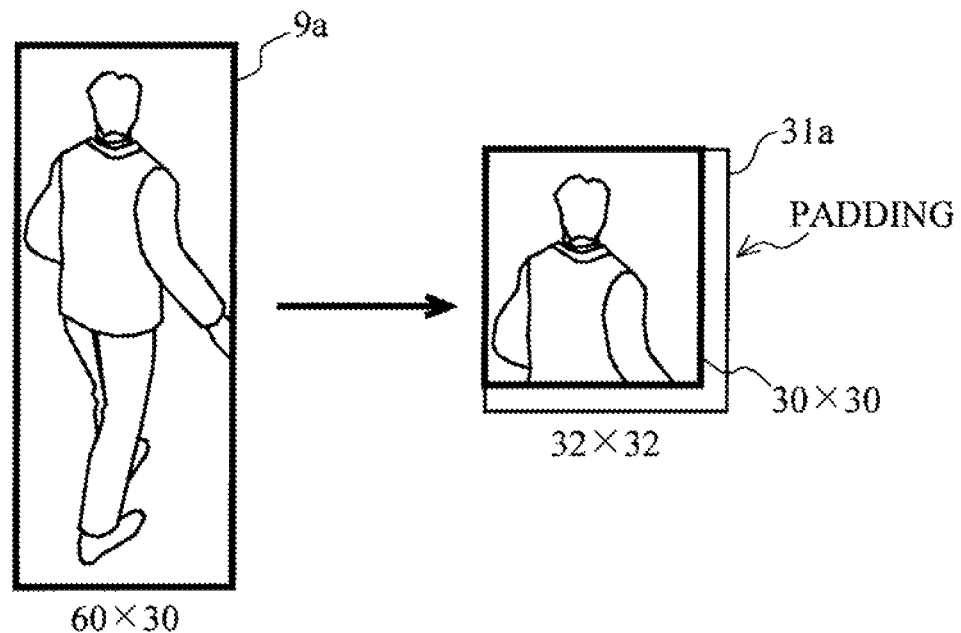
FIG. 4 is a diagram for describing a modified example of the clipping.
Figure 4:
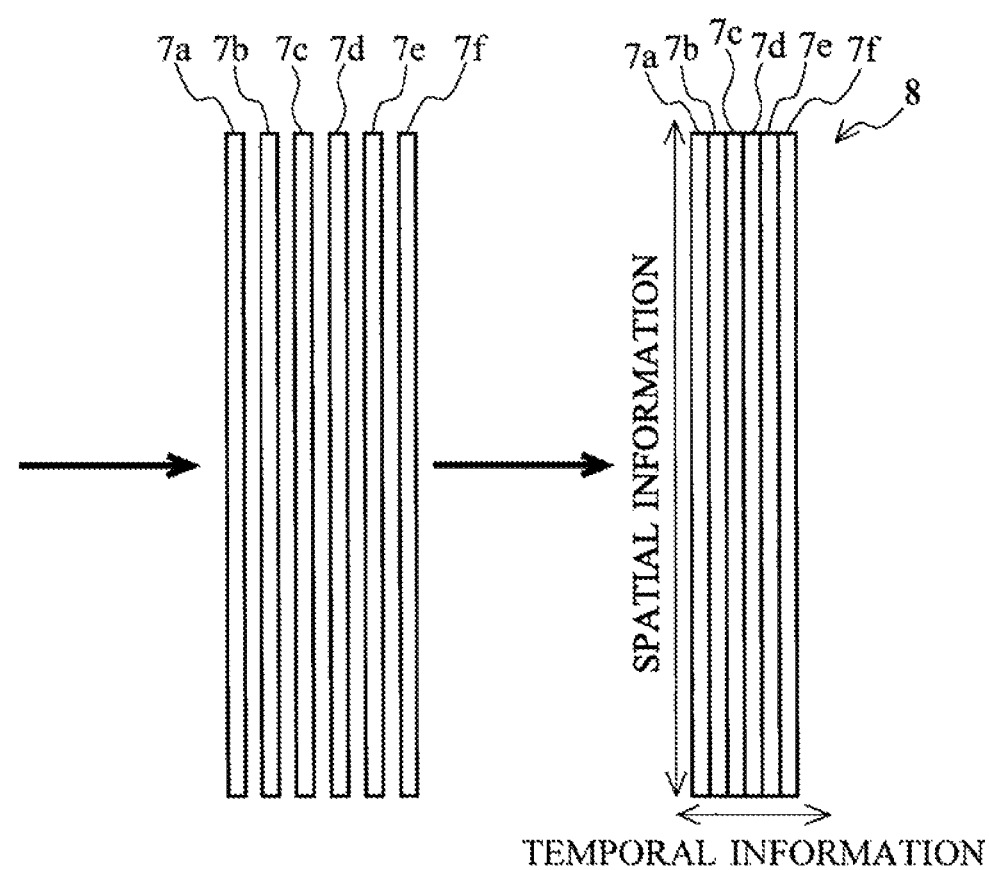

FIG. 4 is a diagram for describing a modified example of the clipping.

In this modified example, the spatio-temporal image data generation unit 2 extracts 30×30 clipping image from an upper half of clipping image 9a, and then executes padding, to generate 32×32 frame image data 31a.

Similarly, the spatio-temporal image data generation unit 2 generates frame image data 31b to 31f (not illustrated) from clipping images 9b to 9f.

Then, the spatio-temporal image data generation unit 2 generates one-dimensional spatial image data 7a to 7f from the frame image data 31a to 31f by means of the Hilbert scan, and arranges the generated one-dimensional spatial image data 7a to 7f in order of time-series to generate spatio-temporal image data 8.

By resizing the clipping image 9 in half, a data amount of the one-dimensional spatial image data 7 and the spatio-temporal image data 8 is also halved, and it is possible to execute processing with more small-sized image recognition device 1.

In this example, although the upper half of the clipping image 9 is clipped again, a lower half or a middle portion thereof may be clipped.

Alternatively, the frame image data 6 may be directly clipped to generate a clipping image.

Figure 5:
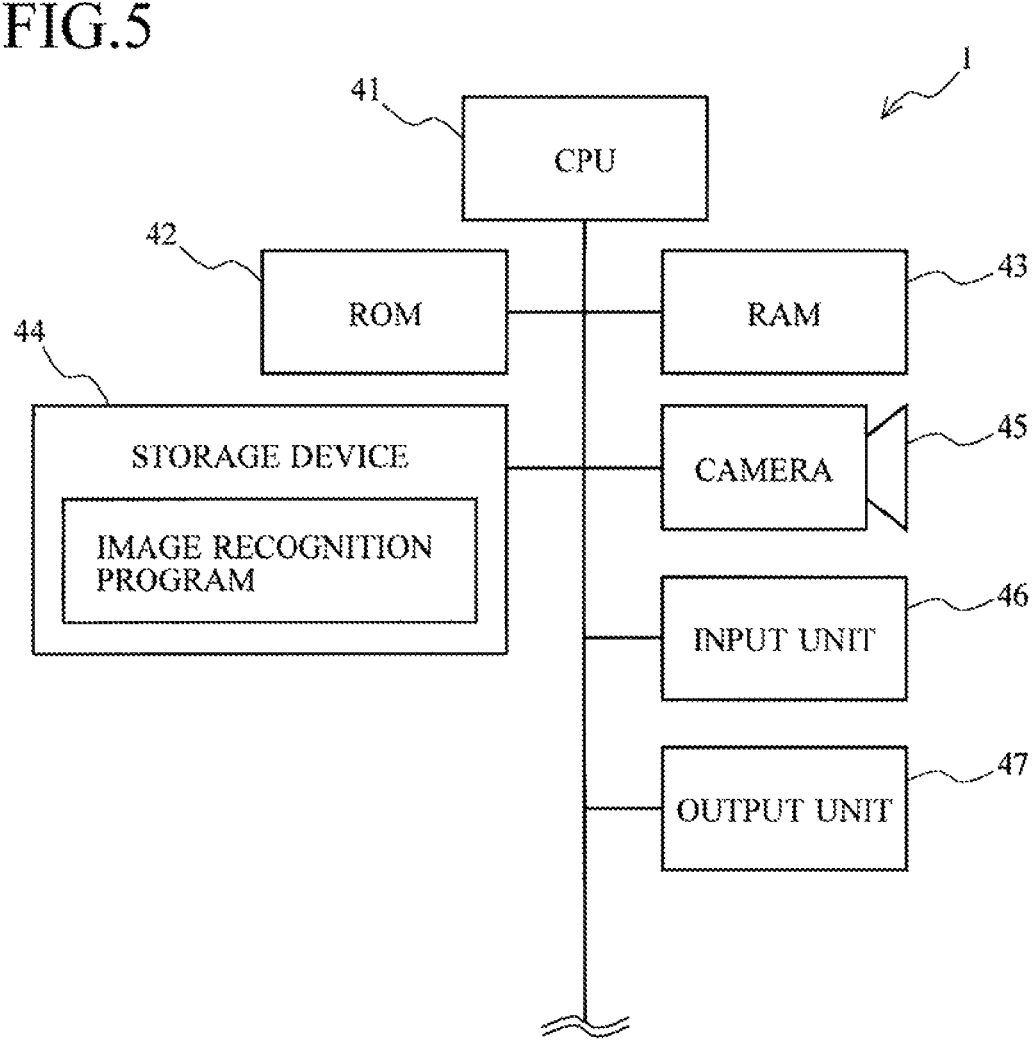
FIG. 5 is a diagram illustrating an example of a hardware configuration of the image recognition device.

FIG. 5 is a diagram illustrating an example of a hardware configuration of the image recognition device 1.

The image recognition device 1 is configured for in-vehicle use, but can be mounted in movable bodies of other forms, such as aircraft and ships, can be mounted in mobile terminals, such as smart phones, or can also be mounted in non-portable devices, such as personal computers.

The image recognition device 1 is configured by connecting a CPU 41, a ROM 42, a RAM 43, a storage device 44, a camera 45, an input unit 46, an output unit 47, and the like to one another through a bus line.

The CPU 41 is a central processing unit and operates in accordance with an image recognition program stored in the storage device 44 to execute the above-described pedestrian image recognition.

The ROM 42 is a read-only memory and stores a basic program and parameters for operating the CPU 41.

The RAM 43 is a readable/writable memory and provides a working memory at the time when the CPU 41 generates the spatio-temporal image data 8 from the moving-image data 4 and further image-recognizes a pedestrian from the spatio-temporal image data 8.

The storage device 44 is configured using a large-capacity recording media, such as a hard disk, and to store the image recognition program.

The image recognition program is a program that causes the CPU 41 to function as the spatio-temporal image data generation unit 2 and the CNN unit 3.

The camera 45 is an in-vehicle camera for capturing moving images outside the vehicle, and outputs the frame image data 6 at a predetermined frame rate.

The input unit 46 is composed by including operation buttons and the like for operating the image recognition device 1, and the output unit 47 is composed by including a display and the like for displaying a setting screen of the image recognition device 1.

In the embodiment, although the image recognition device 1 is an in-vehicle device, it can also be configured so that the camera 45 may be installed in the vehicle, the moving image may transmitted to a server through a network communication, and the image-recognize may be executed in the server and a recognized result thereof may be transmitted to the vehicle.

Figure 6:
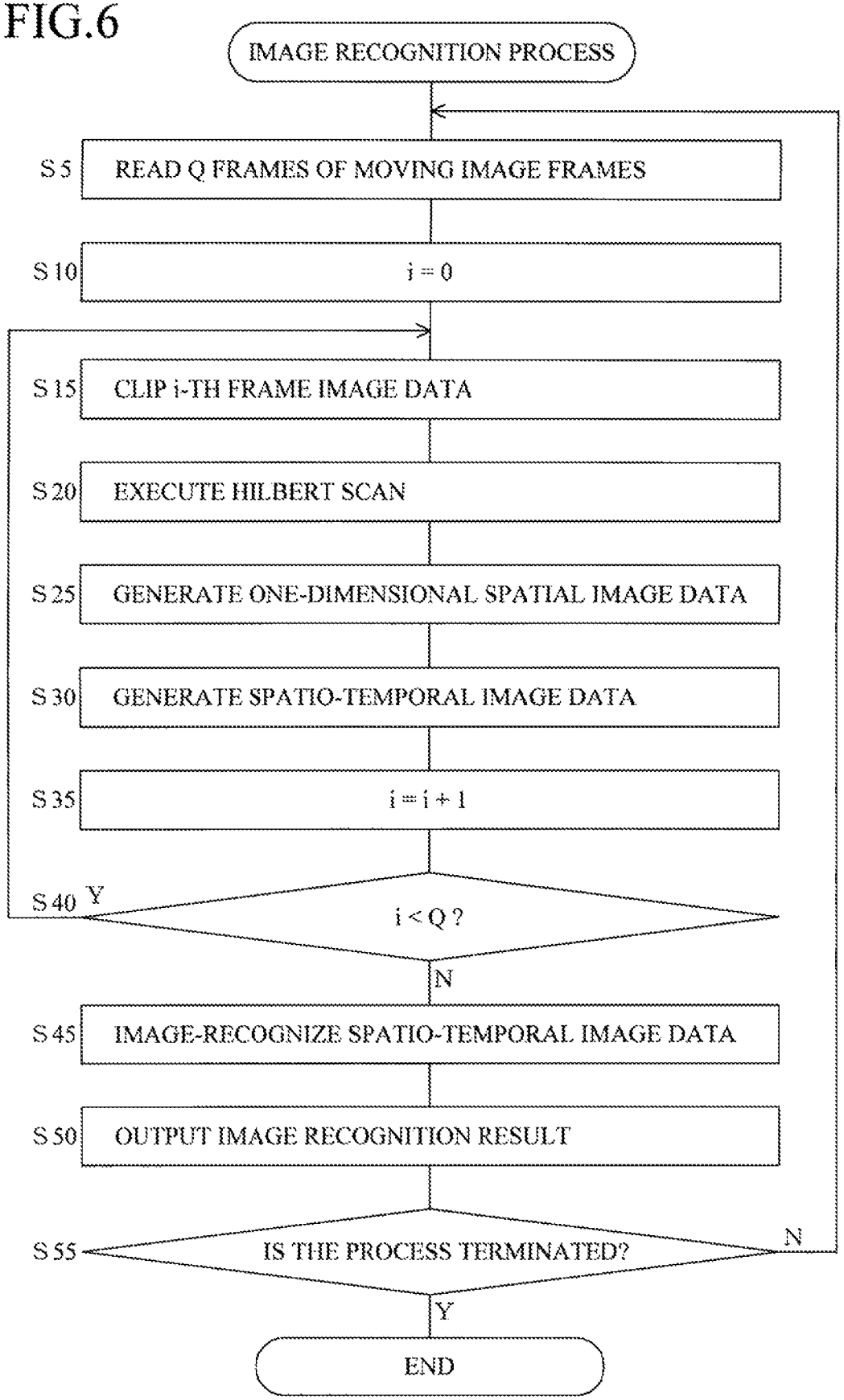
FIG. 6 is a flow chart for describing a procedure of an image recognition process.

FIG. 6 is a flow chart for describing a procedure of the image recognition process executed by the image recognition device 1.

The following processing is executed by the CPU 41 in accordance with the image recognition program. Moreover, function units corresponding to a process of the CPU 41 are respectively illustrated in parentheses.

First, the camera 45 captures the outside of the vehicle and sequentially outputs the moving-image data 4.

Next, the CPU 41 (spatio-temporal image data generation unit 2) reads Q moving image frames (Step 5). More specifically, the CPU 41 reads a predetermined number Q (e.g., six frames) of the frame image data 6 in the moving-image data 4 to be output into the RAM 43 in the order of output.

Next, the CPU 41 (spatio-temporal image data generation unit 2) sets a parameter i to 0, and stores the set parameter in the RAM 43 (Step 10).

Then, the CPU 41 (spatio-temporal image data generation unit 2) reads i-th frame image data 6 from the RAM 43, generates a clipping image 9 therefrom, and stores the generated clipping image 9 in the RAM 43 (Step 15). The region for generating the clipping image 9 from the frame image data 6 is determined at random in the basis of a random number which is generated.

It is noted that the i=0th frame image data 6 correspond to the first of the Q frames. That is, the i-th frame image data 6 correspond to the i+1th frame of the Q frames.

Next, the CPU 41 (spatio-temporal image data generation unit 2), restores the frame image data 6 by padding the clipping image 9, and stores the restored frame image data 6 in the RAM 43.

Then, the CPU 41 (spatio-temporal image data generation unit 2) sets the Hilbert curve to the aforementioned frame image data 6 stored in the RAM 43, executes the Hilbert scan (Step 20), and generates the one-dimensional spatial image data 7 (Step 25).

Next, the CPU 41 (spatio-temporal image data generation unit 2) stores the generated one-dimensional spatial image data 7 in the RAM 43, and generates the spatio-temporal image data 8 (Step 30).

It is noted that: when i=0, the first one-dimensional spatial image data 7a is firstly stored in the RAM 43; and when i=1, 2, . . . it is added to the one-dimensional spatial image data 7 already stored in the RAM 43 in time-series.

Next, the CPU 41 (spatio-temporal image data generation unit 2) determines whether i is less than Q (Step 40), after incrementing i stored in the RAM 43 by 1 (Step 35).

If i is less than Q (Step 40; Y), the CPU 41 (spatio-temporal image data generation unit 2) returns to Step 15, and executes the same process to the next frame image data 6.

On the other hand, if i is not less than Q (Step 40; N), since the spatio-temporal image data 8 are completed in the RAM 43, the CPU 41 (CNN unit 3) reads the spatio-temporal image data 8 from the RAM 43 and image-recognizes the read spatio-temporal image data 8 (Step 45).

Then, the CPU 41 (CNN unit 3) outputs the image recognition result to a predetermined output destination (Step 50).

The output destination is a control system of the vehicle, for example, and performs braking of the vehicle speed if a pedestrian exists in front of the vehicle.

Next, the CPU 41 (CNN unit 3) determines whether or not the image recognition process is terminated (Step 55).

When not terminating the process (Step 55; N), the CPU 41 (CNN unit 3) returns to Step 5. On the other hand, when a user selects an end button in order to terminate the process (Step 55; Y), the CPU 41 (CNN unit 3) terminates the process.

FIG. 7 is a diagram for describing an experimental result.

This diagram is a table showing the results of evaluating an image recognition capability of the image recognition device 1 by means of an evaluation method called 10-fold cross validation.

The 10-fold cross validation is an evaluation method of repeating a process of dividing one data set (e.g., 10,000 sets of the spatio-temporal image data 8) into 10 pieces (1,000 sets) thereof, then learning with 9 pieces thereof, and evaluating a percentage of correct answers with the remaining one piece thereof.

The upper column of this table illustrates a case where the image recognition device 1 is used, and the lower column illustrates a case where a conventional technology (different from that described in the prior art) called Long Short Term Memory (LSTM) is used.

The evaluation item is percentages of correct answers, which is 77.1% for the image recognition device 1 and 74.0% for the LSTM.

Thus, the percentage of the correct answers in the image recognition device 1 exceeds that of the LSTM, and it can be proved that the image recognition device 1 has a high image recognition capability as compared with the conventional technology.

Modified Example 1

Although the pixels to be discretized by clipping are distributed in the embodiment, the pixels to be discretized are distributed by changing a path of the Hilbert scan, i.e., a form of the Hilbert curve, for each frame image data 6, in this modified example.

A case where a first step from a starting point of the Hilbert curve proceed to right side is referred to as form 1, a case where it proceeds to a lower side is referred to as form 2, a case where it proceeds to an upper side is referred to as form 3, and a case where it proceeds to a left side is referred to as form 4. When a position of the first step is an outside of the frame image data 6, padding is executed and it is assumed that the pixel value is not read at the time of scanning with regard to the padding portion.

Thus, the spatial information and the temporal information are comprehensively held by preparing a plurality of forms of the Hilbert curve to be suitably assigned to the frame image data 6.

Several kinds of ways of the assigning can be considered. For example, from the form 1 to form 4 may be assigned in order, such as: the Hilbert scan of the frame image data 6a may be executed by the Hilbert curve of the form 1; the Hilbert scan of the frame image data 6b may be executed by the Hilbert curve of the form 2; and so on. Alternatively, the forms 1 to 4 may be freely assigned, such as: a form freely selected from the forms 1 to 4 may be assigned to the frame image data 6a; a form freely selected from the remaining forms may be assigned to the frame image data 6b; and so on.

Alternatively, the curve forms may be changed in accordance with different types of the space-filling curves, such as: the Hilbert curve is used for the frame image data 6a; the Peano curve is used for the frame image data 6b; the Hilbert curve is used for the frame image data 6c; the Peano curve is used for the frame image data 6d; and so on, for example.

Furthermore, both the curve types and the curve forms may be changed, such as: the Hilbert curve of the form 1 is used for the frame image data 6a; the Peano curve of the form 1 is used for the frame image data 6b; the Hilbert curve of the form 2 is used for the frame image data 6c; the Peano curve of the form 2 is used for the frame image data 6d; and so on, for example.

Thus, the spatio-temporal image data generation unit 2 of the modified example 1 is configured to change the curve setting forms for each frame image data, as the curve setting conditions.

Modified Example 2

Although the modified example 1 changes the forms of the Hilbert curve to execute the Hilbert scan for each frame image data 6, this modified example 2 sets a plurality of the Hilbert curves having different forms for one frame image data 6.

For example, the frame image data 6a are scanned with the Hilbert curve of the form 1 to generate one-dimensional spatial image data 7a1, the frame image data 6a are scanned with the Hilbert curve of the form 2 to generate one-dimensional spatial image data 7a2, . . . , then the frame image data 6b are scanned with the Hilbert curve of the form 1 to generate one-dimensional spatial image data 7b1, the frame image data 6b are scanned with the Hilbert curve of the form 2 to generate one-dimensional spatial image data 7b2, . . . , and so on, for example. In this way, after each frame image data 6 is scanned multiple-times with different Hilbert curves up to the frame image data 6f, the spatio-temporal image data 8 is generated by arranging the one-dimensional spatial image data 7a1, 7a2, . . . , 7b1, 7b2, . . . .

Alternatively, the spatio-temporal image data 8a is generated from the one-dimensional spatial image data 7a1, 7b1, . . . ; the spatio-temporal image data 8b is generated from the one-dimensional spatial image data 7a2, 7b2, . . . ; and so on, for example. In this way, a plurality of the spatio-temporal image data 8a, 8b, . . . may be generated to be individually image-recognized, and a result thereof may be comprehensively determined.

Alternatively, it is also possible to generate a plurality of the one-dimensional spatial image data 7a1, 7a2, . . . by clipping the same frame image data 6a freely multiple-times and padding the clipped frame image data 6a to be subjected to the Hilbert scan. Similarly, the one-dimensional spatial image data 7b1, 7b2, . . . is generated from the frame image data 6b.

Thus, the plurality of one-dimensional spatial image data 7 can also be generated from the same frame image data 6 by clipping the frame image data 6 freely multiple-times.

As described above, the image recognition device 1 of the modified example 2 is configured to change the curve setting conditions with respect to the same frame image data to acquire the data value for each the setting conditions.

Modified Example 3

In the modified example 3, a region of the clipping image 9 is set to one frame image data 6 multiple-times at random, and a plurality of clipping images 9 of are generated from the one frame image data 6.

For example, a clipping image 9a1 of the region 1 is generated from the frame image data 6a, similarly a clipping image 9a2 of the region 2 is generated from the frame image data 6a, . . . , then a clipping image 9b1 of the region 1 is generated from the frame image data 6b, similarly a clipping image 9b2 of the region 2 is generated from the frame image data 6b, . . . , and so on, for example. In this way, a plurality of clipping images 9 having different clipped regions are generated on the basis of each frame image data 6 up to the frame image data 6f.

Then, the spatio-temporal image data generation unit 2 restores the frame image data 6 by padding each of these clipping images 9.

Consequently, a plurality of the frame image data 6a1, 6a2, . . . are restored from the frame image data 6a of the original image. The same applies to the frame image data 6b, 6c, . . . .

The spatio-temporal image data generation unit 2 executes the Hilbert scan on the frame image data 6a1, 6a2, . . . , 6b1, 6b2, . . . to generate the one-dimensional spatial image data 7, and arranges them in time-series to generate the spatio-temporal image data 8.

Alternatively, the spatio-temporal image data generation unit 2 may generate and image-recognize the spatio-temporal image data 8a from the frame image data 6a1, 6b1, may generate and image-recognize the spatio-temporal image data 8b from the frame image data 6a2, 6b2, . . . , and may comprehensively determine a result of the image recognitions.

Modified Example 4

The modified example 2 and the modified example 3 are combined with each other. More specifically, the frame image data 6a1, 6a2, . . . , 6b1, 6b2, . . . generated in the modified example 3 are scanned with a plurality of types of the curves.

For example, the scanning is executed so that the frame image data 6a1 is scanned with the Hilbert curve of the form 1, the frame image data 6a2 is scanned with the Peano curve of the form 1, . . . , and so on.

Modified Example 5

In the embodiment described above, the Hilbert scan of the three-dimensional moving-image data 4 having the components (x, y, t) of the two dimensions for space and the one dimension for time is executed in the spatial direction (x, y direction) to generate the one-dimensional spatial image data 7a, 7b, . . . having the components (α, t1), (α, t2), . . . ; and the generated one-dimensional spatial image data 7a, 7b are arranged in order of the time directions t1, t2, . . . , to generate the two-dimensional spatio-temporal image data 8 have the component (α, t). Here, α is a coordinate value representing a position of the pixel as a length along the Hilbert curve.

In the modified example 5, the Hilbert scan is executed in a direction of time coordinate (t-axis).

For example, it is possible to generate the two-dimensional spatio-temporal image data 8 having a component (x, α) by: executing the Hilbert scan in the direction (y, t) to generate the one-dimensional spatial image data 7a, 7b, . . . having (x1, α), (x2, α), . . . ; and arranging the generated one-dimensional spatial image data 7a, 7b in order of x1, x2, . . . . Similarly, it is also possible to generate the spatio-temporal image data 8 having a component (y, α) by executing the Hilbert scan in the direction (x, t).

Moreover, three types of the spatio-temporal image data 8 respectively having components of (α, t), (x, α), and (y, α) are generated for the same moving-image data 4, and it is possible to execute the image-recognition process by combining the generated spatio-temporal image data 8.

For example, the spatio-temporal image data 8 having the component (α, t) is image-recognized, the spatio-temporal image data 8 having the component (x, α) is image-recognized, and the spatio-temporal image data 8 having the component (y, α) is image-recognized, and then each result is weighted with an output value of the fully coupling layer 17 to obtain a weighted average; or three spatio-temporal image data 8 generated from each of (α, t), (x, α) and (y, α) are arranged to obtain one spatio-temporal image data 8, and thereby it is possible to image-recognize the aforementioned spatio-temporal image data 8.

It is expected that the frame rate of moving images can be reduced by scanning in the time direction. Consequently, the load of the image processing can be reduced.

Modified Example 6

In this modified example 6, higher order time-series spatial information is image-recognized.

In recent years, there has been studied a technology for automatically driving vehicles by reading topographies in front of the vehicles by means of a technology using a laser radar called rider (LiDAR).

Time-series spatial information acquired by the rider is four-dimensional data having a component (x, y, z, t) of three-dimensions for space and one dimension for time.

When such time-series spatial information is scanned by the Hilbert curve bent in the three-dimensions for space direction (x, y, z), one-dimensional spatial image data 7 having (α, t1), (α, t2), . . . can be acquired. When the acquired one-dimensional spatial image data 7 is arranged in the time-series of t1, t2, . . . , spatio-temporal image data 8 having a two-dimensional component (α, t) is acquired. By image-recognizing the acquired spatio-temporal image data 8, it becomes possible to detect a pedestrian, a topography, and the like. It is also possible to executing the scanning in the time direction similarly to the modified example 5.

Moreover, the one-dimensional spatial image data 7 composed of (α, z1, t1), (α, z2, t1), (α, z3, t1), . . . , (α, z1, t2), (α, z2, t2), (α, z3, t2), . . . can be acquired by fixing four-dimensional time-series spatial information in the direction z and the direction t, and executing the Hilbert scan in the direction (x, y).

By arranging this data in the direction z with t1 being fixed, two-dimensional spatial image data having (α, z, t1), (α, z, t2), . . . can be acquired.

Furthermore, when the acquired two-dimensional spatial image data is arranged in time-series, three-dimensional spatio-temporal image data having (α, z, t) can be acquired.

It is possible to image-recognize the above-mentioned three-dimensional spatio-temporal image data by setting a three-dimensional filter as a convolution filter of the image recognition device 1.

It is also possible to executing the Hilbert scanning in the time direction similarly to the modified example 5.

Thus, it is possible to convert n dimensions (where n is an integer greater than or equal to 2) into n−1 dimensions or less spatio-temporal image data by means of the Hilbert scan.

Accordingly, it is possible to generate high-dimensional time-series spatial information by adding further information such as color information and various sensor values, and reduce the dimensions to recognize the image by the image recognition device 1.

Modified Example 7

Figure 8A:
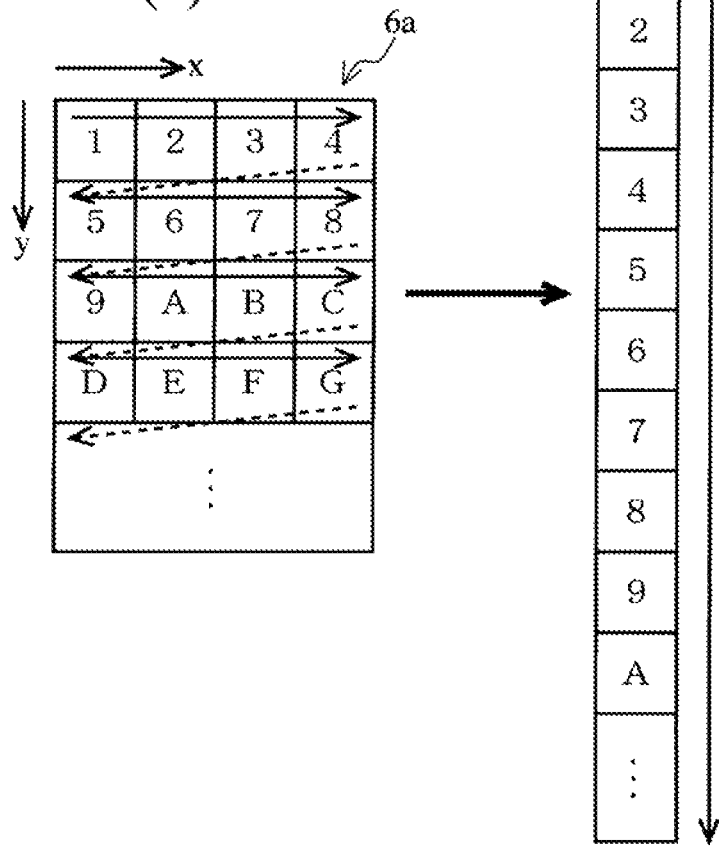
FIG. 8 are a diagram for describing a modified example 7.
Figure 8B:
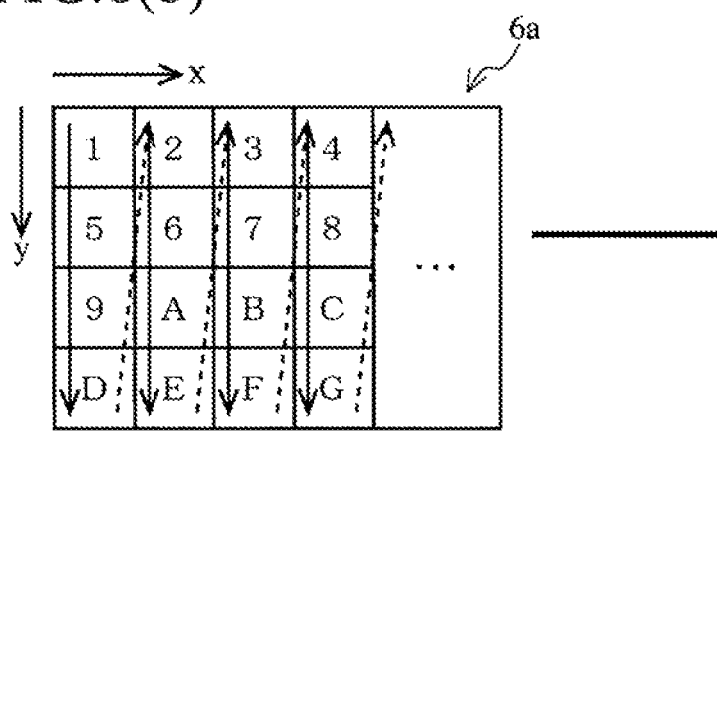

FIG. 8 are drawings for explaining a modified example 7. In this modified example 7, image data are scanned by a raster scan.

The spatio-temporal image data generation unit 2 detects an aspect ratio of the frame image data 6 illustrated in FIG. 8(a), and determines a non-longitudinal direction as a scanning direction. This is because a recognition rate is higher in the case where the non-longitudinal direction is used for the scanning direction than in the case where the longitudinal direction is used for the scanning direction, as below-described in the experimental result.

Then, the spatio-temporal image data generation unit 2 executes the raster scan of the entire frame image data 6 by scanning along a linear scanning path in the non-longitudinal direction.

Although the entire frame image data 6 is scanned in this example, image data obtained by clipping the frame image data 6, image data extracted as an interesting area from the frame image data 6, and image data obtained by clipping the extracted image data can also be used as an object.

Thus, the spatio-temporal image data generation unit 2 functions as a data value acquiring means for acquiring the column of the data values along the linear scanning path, and includes a scanning direction determining means for determining the scanning direction of the scanning path with respect to at least a part of image data in the frame image constituting the moving-image data.

Furthermore, the aforementioned scanning direction determination means is configured to determine the scanning direction as the non-longitudinal direction of the image formed of the image data.

In the case of the frame image data 6a shown in FIG. 8(a), since the x-axial direction is a non-longitudinal direction and the y-axis is a longitudinal direction, the spatio-temporal image data generation unit 2 determines the x-axial direction as a scanning direction.

Then, the spatio-temporal image data generation unit 2 sequentially reads pixel values in the x-axial direction from the pixel 1 to the pixel 4 in the first row along the solid arrow illustrated in the diagram. When the scanning reaches the pixel 4 at the end, the spatio-temporal image data generation unit 2 moves the scanning start position to the first pixel 5 in the second row, as illustrated by the dashed arrow line, and sequentially reads pixel values up to the end pixel 8 in the x-axial direction.

Thereafter, the spatio-temporal image data generation unit 2 repeats the same operation to read all the pixel values of the frame image data 6*a*, and arranges the read data in a line to generate the one-dimensional spatial image data 7*a*. Furthermore, the spatio-temporal image data generation unit 2 similarly generates the one-dimensional spatial image data 7*b*, 7*c*, . . . .

Then, the spatio-temporal image data generation unit 2 generates the spatio-temporal image data 8 from the generated one-dimensional spatial image data 7*a*, 7*b*, . . . . The procedure for image-recognizing this data by the CNN unit 3 is the same as that of the above-mentioned embodiment.

The above-mentioned raster scan method is merely an example. For example, it may scan in the direction from the pixel 4 to the pixel 1 which is opposite to the direction of the solid arrow line. Alternatively, when the pixels in the first row are read in order from the pixel 1 to the pixel 4, the second row may be raster-scanned along a meandering straight path such as reading in the direction from the pixel 8 to the pixel 5.

An experiment to calculate a percentage of correct answers by means of 10-fold cross validation is performed between a case of using a one-dimensional conversion which executes the raster scan in the non-longitudinal direction and the longitudinal direction and develops the pixels and a case of using a one-dimensional conversion by means of the Hilbert scan. The percentage of correct answers in the case of executing the raster scan in the non-longitudinal direction is 82.2%, the percentage of correct answers in the case of executing the raster scan in the longitudinal direction is 77.7%, and the percentage of correct answers in the case of executing the Hilbert scan is 83.6%.

Thus, the percentage of correct answers in the case of the raster scan in the non-longitudinal direction is higher than the percentage of correct answers in the case of the raster scan in the longitudinal direction. Therefore, in the case of the raster scan in the non-longitudinal direction, the percentage of correct answers near the percentage of correct answers in the case of the Hilbert scan can be realized.

It is considered that: this is because the moving distance at the time of moving to the next pixel row at the endpoint of the image data in the case of the raster scan in the non-longitudinal direction is smaller than that of the raster scan in the longitudinal direction; and therefore a state of preservation of the locality of the image in the case of the raster scan in the non-longitudinal direction is superior to that in the case of the raster scan in the longitudinal direction.

FIG. 8 (*b*) illustrates a case where the y-axial direction is the non-longitudinal direction.

In this case, the spatio-temporal image data generation unit 2 sequentially reads the pixel values from the pixel 1 to the pixel D in the non-longitudinal direction (i.e., y direction) as illustrated by the solid arrow line. Then, when the pixel D at the end is reached, the spatio-temporal image data generation unit 2 moves the reading point to the first pixel 2 in the next column as illustrated by the dashed arrow line, and reads the pixel values up to the pixel E.

Thereafter, the spatio-temporal image data generation unit 2 repeats the same operation to read all the pixel values of the frame image data 6*a*, and arranges the read data in a line to generate the one-dimensional spatial image data 7*a*.

The spatio-temporal image data generation unit 2 determined the non-longitudinal direction as the scanning direction in consideration of the aspect ratio of the frame image data 6 in the above example, but if the non-longitudinal direction of the image data is previously determined, it is possible to set the aforementioned direction as the scanning direction and omit the determination process of the aspect ratio.

Figure 9:
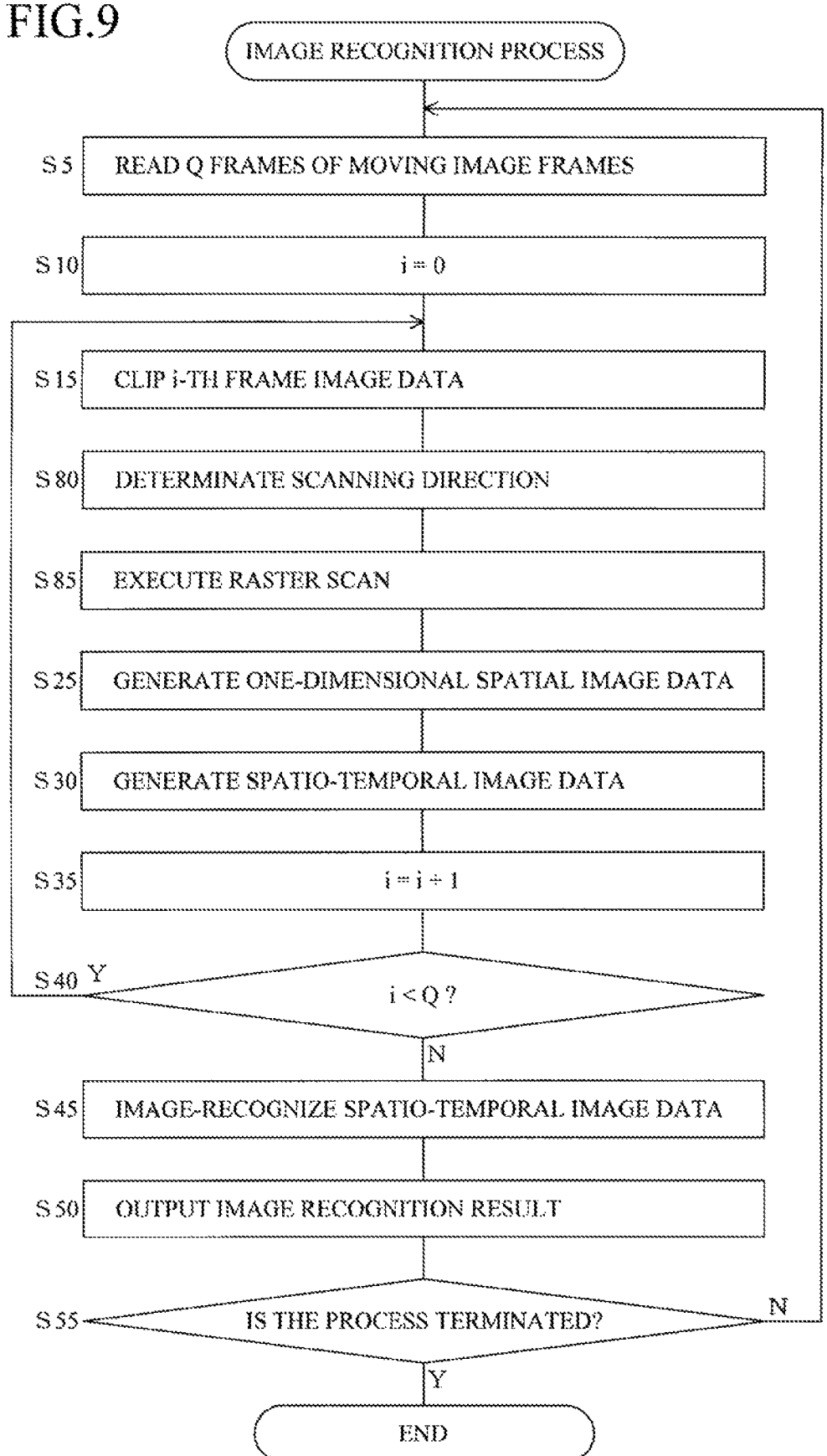
FIG. 9 is a flow chart for describing a procedure of an image recognition process of the modified example 7.

FIG. 9 is a flow chart for describing a procedure of the image recognition process of the modified example 7.

The same processes as those in the above-described embodiment are denoted by the same step numbers, and description thereof is omitted.

In this example, the data augmentation is executed by clipping the frame image data 6.

When i-th frame image data is clipped in Step 15, the spatio-temporal image data generation unit 2 determined the non-longitudinal direction of the frame image data 6 after the clipping, as the scanning direction (Step 80).

Then, the spatio-temporal image data generation unit 2 executes the raster scan of the frame image data 6 after the clipping in the determined scanning direction (Step 85), and generates the one-dimensional spatial image data 7 (Step 25). Other procedures are the same as those of the above-mentioned embodiment.

In the above example, the raster scan is executed in the non-longitudinal direction. However, for example, when it is preferable to execute the raster scan in the longitudinal direction due to a hardware factor etc. (e.g., it is preferable that the processing speed is faster even if accuracy is reduced), the raster scan may be executed in the longitudinal direction depending on a user's situation.

Modified Example 8

Figure 10A:
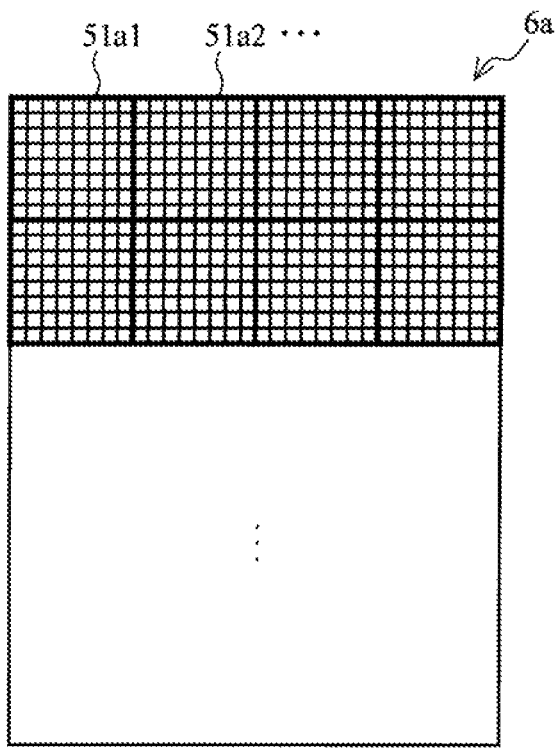
FIG. 10 are a diagram for describing a modified example 8.

FIG. 10 are drawings for explaining a modified example 8.

The spatio-temporal image data generation unit 2 of this modified example 8 divides the frame image data 6 into a small region 51, and executes a raster scan for each of the divided small region 51.

In the example in FIG. 10(*a*), the spatio-temporal image data generation unit 2 divides the frame image data 6 into square-shaped small regions 51*a*1, 51*a*2, . . . illustrated by the thick lines. The squares in the small region 51 represent the pixels.

The spatio-temporal image data generation unit 2 executes the raster scan of each small region 51, such as: executes the raster scan of the small region 51*a*1 to generate one-dimensional spatial image data 7*a*1 (not illustrated); subsequently executes the raster scan of the small region 51*a*2 to generate one-dimensional spatial image data 7*a*2; . . . , and so on. The scanning direction of the scan is a non-longitudinal direction of the frame image data 6*a*, for example.

Then, the spatio-temporal image data generation unit 2 connects the one-dimensional spatial image data 7*a*1, 7*a*2, . . . to one another in a line to generate one-dimensional spatial image data 7*a* (not illustrated) of the frame image data 6*a*.

Similarly, the spatio-temporal image data generation unit 2 generates one-dimensional spatial image data 7*b*, 7*c*, . . . , and arranges the generated one-dimensional spatial image data 7*b*, 7*c* in the time direction to generate spatio-temporal image data 8 (not illustrated).

The order of connecting the one-dimensional space image data 7*a*1, 7*a*2, . . . can be various orders. For example, the order of connecting may be an order of executing the raster scan for the small region 51*a*1, the small region 51a2, . . . , and so on in the non-longitudinal direction of the frame image data 6a, or may be an order of being connected by the Hilbert curve set to connect the small region 51a1, the small region 51a2, . . . . In the latter case, the raster scan and the Hilbert scan are combinable with each other. Alternatively, the Hilbert scan is performed in the small regions 51a1, 51a2, . . . , the one-dimensional spatial image data 7a1, 7a2, . . . acquired as a result thereof connected in the order of the raster scanning of the small regions 51a1, 51a2, . . . , and thereby the raster scan and the Hilbert scan can also be combined with each other.

Figure 10B:
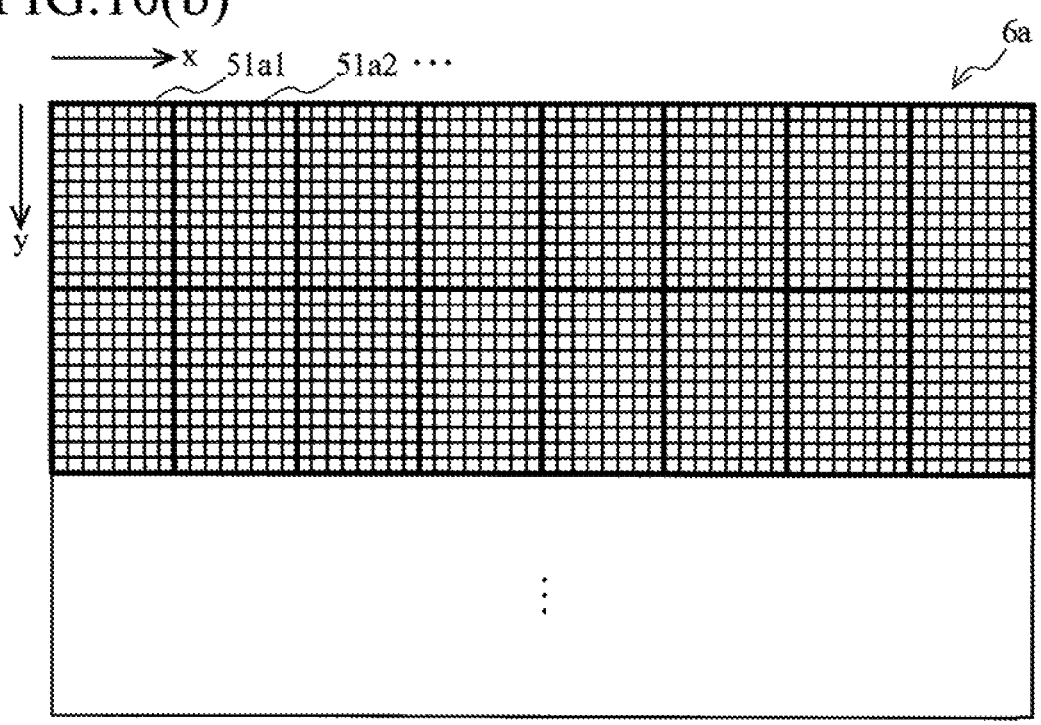

FIG. 10(b) illustrates an example in which small regions 51a1, 51a2, . . . of which the x-axial direction is the non-longitudinal direction, with respect to the frame image data 6a of which the y-axial direction is the non-longitudinal direction.

In this case, it can be configured so that the short direction of the small regions 51 can be preferentially raster scanned in the x-axial direction, with regard to the small regions 51a1, 51a2, . . . , for example.

With regard to the one-dimensional spatial image data 7a1, 7a2, . . . (not illustrated) generated from the small regions 51a1, 51a2, . . . , they are connected in an appropriate predetermined order, as in the case of FIG. 10(a).

According to the embodiment and the modified examples described above, the following effects can be obtained.

(1) Moving-image data can be expressed by two-dimensional image data.

(2) Two-dimensional spatio-temporal image data 8 can be generated from the moving-image data 4 (time-series image data) by executing image conversion of the frame image data 6 using the Hilbert scan using the space-filling curve or the raster scan, while holding the spatial information and the temporal information.

(3) By using the spatio-temporal image data 8 as input data, the moving-image data can be image-recognized in the CNN using the two-dimensional filter.

(4) Since a relationship can be given to information between pixels which are adjacent to each other in the spatio-temporal image data 8, improvement in image recognition accuracy can be expected.

(5) Since the CNN using the general two-dimensional filter can be used, the cost required for introducing the CNN and the calculation cost required for executing the CNN can be reduced, and the recognition accuracy can be improved.

(6) Generally, since no expensive hardware is mounted in in-vehicle cameras and in-vehicle computers, the image recognition device 1 that uses less memory and has low calculation cost is suitable for mounting.

(7) It is possible to comprehensively hold the spatial information of the spatio-temporal image data 8 by changing the setting conditions of the curve to be scanned such as data augmentation.

(8) In the pre-learning phase, the image recognition phase, and the like, holding of a spatial information and time information can be comprehensively performed by executing data augmentation which randomly clips a slightly small image.

EXPLANATION OF LETTERS OR NUMERALS 1 image recognition device
2 spatio-temporal image data generation unit
3 CNN unit
4 moving-image data
6, 31 frame image data
7 one-dimensional spatial image data
8 spatio-temporal image data
9 clipping image
11, 13, 15 convolution layer
12, 14, 16 pooling layer
17 fully coupling layer
20, 24 image data
21, 25 hilbert curve
22, 26 one-dimensional spatial image data
27, 28 region
41 CPU
42 ROM
43 RAM
44 storage device
45 camera
46 input unit
47 output unit
51 small region

The invention claimed is:

1. An image data generation device comprising:
a time-series spatial information acquiring means for acquiring time-series spatial information in which a position of a recognition object in space is recorded in accordance with a lapse of time;
a data value acquiring means for scanning the acquired time-series spatial information in a predetermined direction to acquire a column of data values in the aforementioned predetermined direction;
an image data generation means for generating image data for image-recognizing the recognition object by arranging the acquired column of the data values corresponding to the other direction of the time-series spatial information; and
an output means for outputting the generated image data, wherein
the predetermined direction is a spatial direction of the time-series spatial information, and the other direction is a time direction of the time-series spatial information,
the data value acquiring means sets a curve which repeats bending corresponding to locality of the data values in the predetermined direction as a scanning path, and acquires the column of the data values along the aforementioned set scanning path,
the data value acquiring means sets a space-filling curve as the curve which repeats the bending,
the time-series spatial information is moving-image data acquired by capturing the recognition object,
the image data generation means sets the curve to each frame image data of the moving-image data, scans each frame image data to acquire a column of pixel values as the column of data values,
the image data generation means generates two-dimensional image data in which the column of the pixel values for each frame image data is arranged corresponding to the time direction, and
the data value acquiring means changes setting conditions of the curve for each frame image data.

2. The image data generation device according to claim 1, wherein the data value acquiring means changes setting ranges of the curve as the setting conditions.

3. An image recognition device comprising:
the image data generation device according to claim 2;
an image data acquiring means for acquiring image data output from the image data generation device;
a learning data acquiring means for acquiring learning data for image-recognizing a recognition object; and a recognition means for recognizing the recognition object included in the acquired image data using the acquired learning data.

4. The image data generation device according to claim 1, wherein the data value acquiring means changes setting forms of the curve for each frame image data as the setting conditions.

5. An image recognition device comprising:
the image data generation device according to claim 4;
an image data acquiring means for acquiring image data output from the image data generation device;
a learning data acquiring means for acquiring learning data for image-recognizing a recognition object; and
a recognition means for recognizing the recognition object included in the acquired image data using the acquired learning data.

6. The image data generation device according to claim 1, wherein the data value acquiring means changes the setting conditions of the curve for the same frame image data, and acquires data values for each the aforementioned setting condition.

7. An image recognition device comprising:
the image data generation device according to claim 6;
an image data acquiring means for acquiring image data output from the image data generation device;
a learning data acquiring means for acquiring learning data for image-recognizing a recognition object; and
a recognition means for recognizing the recognition object included in the acquired image data using the acquired learning data.

8. An image recognition device comprising:
the image data generation device according to claim 1;
an image data acquiring means for acquiring image data output from the image data generation device;
a learning data acquiring means for acquiring learning data for image-recognizing a recognition object; and
a recognition means for recognizing the recognition object included in the acquired image data using the acquired learning data.

9. An image data generation device comprising:
a time-series spatial information acquiring means for acquiring time-series spatial information in which a position of a recognition object in space is recorded in accordance with a lapse of time;
a data value acquiring means for scanning the acquired time-series spatial information in a predetermined direction to acquire a column of data values in the aforementioned predetermined direction;
an image data generation means for generating image data for image-recognizing the recognition object by arranging the acquired column of the data values corresponding to the other direction of the time-series spatial information; and
an output means for outputting the generated image data, wherein
the predetermined direction is a spatial direction of the time-series spatial information, and the other direction is a time direction of the time-series spatial information,
the data value acquiring means acquires the column of the data values along a linear scanning path,
the time-series spatial information is moving-image data acquired by capturing the recognition object, and
the image data generation device further comprises a scanning direction determining means for determining a scanning direction of the scanning path for at least a part of still image data of frame images constituting the moving-image data,
the data value acquiring means acquires the column of the data values along the determined scanning direction,
the image data generation means generates two-dimensional image data in which a column of pixel values, as the column of data values, for each still image data is arranged corresponding to the time direction, and
the scanning direction determining means determines a non-longitudinal direction of an image formed with the still image data, as the scanning direction.

10. An image recognition device comprising:
the image data generation device according to claim 9;
an image data acquiring means for acquiring image data output from the image data generation device;
a learning data acquiring means for acquiring learning data for image-recognizing a recognition object; and
a recognition means for recognizing the recognition object included in the acquired image data using the acquired learning data.

* * * * *